United States Patent [19]

Grover et al.

[11] 4,011,491
[45] Mar. 8, 1977

[54] MOTOR SPEED CONTROL CIRCUIT

[75] Inventors: Lawrence L. Grover, Saint Joseph; David L. Plangger, Buchanan, both of Mich.

[73] Assignee: Heath Company, Benton Harbor, Mich.

[22] Filed: Mar. 21, 1975

[21] Appl. No.: 560,944

Related U.S. Application Data

[63] Continuation of Ser. No. 452,691, March 19, 1974, which is a continuation of Ser. No. 288,216, Sept. 11, 1972, abandoned.

[52] U.S. Cl. ............................. 318/327; 318/341; 318/345 R
[51] Int. Cl.² ........................................ H02P 5/00
[58] Field of Search ................. 318/313, 326–328, 318/341, 345

[56] References Cited

UNITED STATES PATENTS

| | | | |
|---|---|---|---|
| 3,407,345 | 10/1968 | Fruehauf et al. | 318/341 |
| 3,596,162 | 7/1971 | Takayama | 318/327 |
| 3,812,410 | 5/1974 | Schaub et al. | 318/345 E X |

*Primary Examiner*—Gene Z. Rubinson
*Attorney, Agent, or Firm*—William R. Sherman; Kevin McMahon; Joseph J. Kaliko

[57] ABSTRACT

A speed-controlling circuit for controlling the rotational speed of a D.C. electric motor in which the electric current is supplied to the D.C. motor through a switching circuit which is periodically open for a predetermined fixed time interval. The switching circuit is controlled by electrical pulses having a repetition rate which varies in dependence upon the rotational speed of the motor, whereby to periodically interrupt the supply of current to the motor.

5 Claims, 4 Drawing Figures

MOTOR SPEED CONTROL CIRCUIT

This is a continuation, of application Ser. No. 452,691 filed March 19, 1974, which is a continuation of Ser. No. 288, 216 filed Sept. 11, 1972, abandoned.

BACKGROUND OF THE INVENTION

This invention relates to speed controlling circuits for controlling the rotational speed of a D.C. electric motor, and is more particularly but not exclusively concerned with much a circuit for controlling the speed of a D.C. motor which is connected to drive a display disc in a flasher type depth sounder.

It is known to control the speed of a D.c. motor at a substantially constant predetermined value by means of a mechanical governor. However, the reliability of such governors is adversely affected by their mechanical construction, and it is difficult to render them adjustable, to permit adjustment of the predetermined constant speed value without substantially increasing their mechanical complexity. This increase in mechanical complexity further reduces the reliability, and increases manufacturing costs.

It is also known to control the speed of a D.C. motor at a substantially constant predetermined value by means of a speed-controlling circuit, which generates a D.C. feedback signal whose D.C. level is proportional to the speed of the motor, and which uses this feedback signal to control the supply of current to the motor. However, such known speed-controlling circuits suffer from the disadvantage that the D.C. level of the feedback signal is sensitive to temperature and supply voltage variations, so that the speed of the motor varies undesirably with changes in ambient temperature and supply voltage. It is difficult to compensate for the effects of these temperatures and supply voltage changes without increasing both the complexity and the cost of the circuits. Moreover, these known circuits normally provide relatively slow starting of the motor from rest.

OBJECTS

It is an object of the present invention, therefore, to provide a speed controlling circuit for controlling the speed of a D.C. motor, which circuit is simple and inexpensive while being relatively insensitive to temperature and supply voltage variations.

It is a further object of the invention to provide such a circuit wherein adjustment of the speed at which the motor is controlled can be readily effected.

Another object of the invention is to provide a speed-controlling; circuit which permits the motor to accelerate relatively rapidly from rest to its controlled speed.

SUMMARY OF THE INVENTION

According to the present invention, a speed-controlling circuit for controlling the rotational speed of a D.C. electric motor comprises switching circuit means for controlling the supply or electric current to the motor, means responsive to the rotational speed of the motor for producing electrical pulses at a repetition rate which varies in dependence upon said rotational speed, and timing circuit means responsive to said electrical pulses to periodically open said switching circuit means for a predetermined fixed time interval, thereby to periodically interrupt the supply of current to the motor.

Thus, since the duration of the predetermined time interval for which the current supply to the motor is interrupted during each revolution thereof is constant, the duration of the time interval for which current is supplied to the motor during each revolution thereof is inversely proportional to the rotational speed of the motor. The rotational speed of the motor therefore stabilizes at a constant value which is determined by the duration of the predetermined fixed time interval.

BRIEF DESCRIPTION OF THE DRAWINGS

The invention will now be described by way of non-limitative example only, with reference to the accompanying drawings, of which FIG. 1 is a schematic circuit diagram of a speed-controlling circuit in accordance with the present invention for controlling a D.C. electric motor for driving the display disc of a flasher-type depth sounder; and.

DETAILED DESCRIPTION OF ILLUSTRATIVE EMBODIMENT

Figure 1:
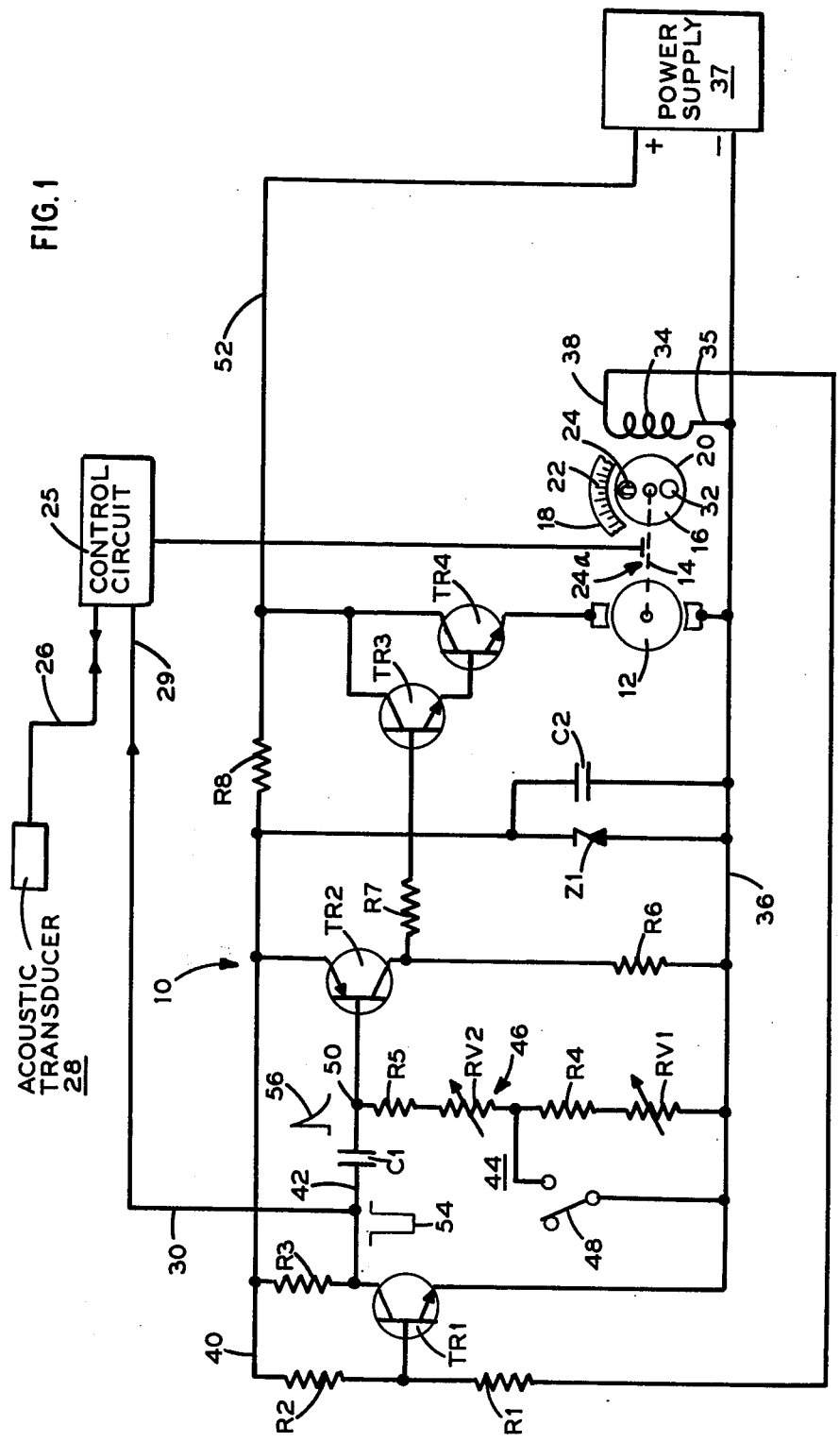

The speed-controlling circuit of FIG. 1 indicated generally at 10, and is shown connected to control the rotational speed of a D.C. electric motor 12. The motor 12 has an output shaft, indicated diagrammetically at 14, which mounts a disc 16 coaxially for rotation with the shaft 14. The disc 16 constitutes the display disc of a flasher-type depth sounder, which may be similar to a type Ml-19 depth sounder available from the Heath Company of Benton Harbor, Michigan, and which will therefore be only briefly described.

The disc 16, is arranged to rotate within a fixed annular scale member 18, with its periphery 20 closely adjacent a plurality of angularly spaced-apart index marks 22 provided on the scale member 18. The index marks 22 represent different depths, typically in feet, to be measured by the depth sounder. A lamp 24 is mounted on a disc 16 adjacent its periphery 20, and is rotatable therewith. The lamp 24 is connected via a conventional slip-ring arrangement 24a to be energized by a control circuit 25, which has a control line 26 connected to a piezo-electric acoustic transducer 28 and an input 29 connected to an input 30 of the speed-controlling circuit 10.

The acoustic transducer 28 is intended to be mounted on the outside of the hull of a boat immersed in the water on which the boat is floating.

When a signal is applied, as will hereinafter be described, to the input 29 of the control circuit 25, the circuit 25 causes the acoustic transducer 28 to emit an acoustic pulse, typically vertically downwardly in the water, and at the same time briefly energizes the lamp 24. The seals member 18 is arranged so that the index mark representative of zero depth is radially aligned with the lamp 24 at this instant. The transducer 28 also detects any reflected pulse resulting from the emitted pulse, the time interval between the emission of a pulse and the detection of its corresponding reflected pulse being proportonal to the depth at which reflection occurred, i.e., the depth of the bottom of the water, or the depth of a submerged reflecting object such as a school of fish. The control circuit 25 again briefly energizes the lamp 24 in response to the detection of the aforementioned corresponding reflected pulse, the angle through which the disc 16 and lamp 24 have rotated since the previous energization of the lamp 24 being a measure of the depth at which reflection occurred. This sequence of events is repeated from each revolution of the disc 16, so it will be appreciated that the accuracy of the depth measurement os dependent upon the accuracy with which the rotational speed of the motor 12 and disc 16 is maintained constant by the speed-controlling circuit 10.

The disc 16 also carries, adjacent its periphery 20, a magnet 32 which rotates with the disc 16 and which cooperates with a stationary electrical winding 34 mounted adjacent the plane of the disc 16, in a region of the periphery 20 thereof. One end 35 of the winding 34 is connected to a negative supply rail 36 of a power supply 37, which the other end 38 is connected, via a resistor R1, to the base of an NPN transistor TR1. The transistor TR1 is connected as a grounded-emitter stage, and has a base bias resistor R2 connected to a positive supply rail 40 and a collector load resistor R3 also connected to the rail 40.

The collector of the transistor TR1 constitutes the aforementioned output 30 of the circuit 10, and is also connected to the input 42 of a timing circuit 44. The timing circuit 44 comprises a capacitor C1 in series with the input 42, and a resistive chain 46 series connected between the rail 36 and the terminal of the capacitor C1 remote from the input 42. The resistive chain 46 comprises, in series order, a first variable resistor RV1, a resistor R4, a second variable resistor RV2 and a resistor R5. A switch 48 is connected between the rail 36 and the junction between the resistor R4 and the variable resistor RV2, to permit the resistor R4 and the variable resistor RV1 to the short-circuited, i.e., effectively removed from the resistive chain 46.

The junction between the capacitor C1 and the resistor R5 constitutes the output 50 of the timing circuit 44, and is connected to the base of a PHP transistor TR2. The transistor TR2 is also connected as a grounded-emitter stage, with its emitter connected to the rail 40 and a collector load resistor R6 connected to the rail 36. The collector of the transistor TR2 is connected, via a resistor R7, to the base of a transistor TR3, which forms the first transistor of a part of NPN transistors TR3, TR4 connected as a super-Bets (or Darlington) pair in the emitter-follower configuration. The motor 12 is connected between the emitter of the second transistor TR4 of this pair and the rail 36, while the collectors of the transistor TR3, TR4 are commonly connected to a positive supply rail 52 of the power supply 37.

The power supply 37 may typically comprise a conventional lead-acid battery having a nominal 12 volt output, and is unregulated: the output voltage thereof may thus vary between, say, 10 volts and 16 volts. The rail 40 is connected to the rail 52 via a resistor R8, and the voltage between the rails 40 and 36 is stabilized, typically by a zener diode 21 and a capacitor C2 connected in parallel with each other between the rails 40 and 36.

Figure 2A:
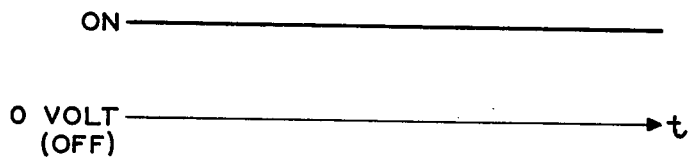
FIGS. 2A, 2B and 2C are explanatory diagrams showing the wave form of the voltage supplied to the motor in the circuit of FIG. 1 at various times during operation.

The values of the resistors R1, R2 are selected so that the transistor TR1 is normally biased into its non-conducting or OFF state, while the value of the resistor R5 is chosen so that, together with the resistive chain 46, it normally biases the transistor TR2 into its saturated or ON state. Thus when the circuit 10 is first energized, the transistor TR2 turns ON, causing the transistors TR3 and TR4 to supply a continuous curret to the motor 12 from the unregulated supply 37 as shown in FIG. 2(i a).

The motor 10 thus accelerates relatively rapidly from rest. Each time the magnet 32 passes the winding 34, i.e., once per revolution of the motor 12, it induces a positive-going voltage pulse therein. The magnitude and the rise and fall times of these pulses increase as the rotational speed of the motor 12 increases until, at a predetermined rotational speed, the magnitude is sufficient to trigger the transistor TR1 into its ON state: the wave-form of the resulting negative-going pulses produced at the collector of the transistor TR1 is indicated at 54 in FIG. 1.

While the negative going edge of pulse 54 does not affect TR2 (since it is already on) C1 is affected by the fact that a charging circuit is now completed from lead 40 through the base-emitter junction of TR2, C1 and now conducting transistor TR1 to lead 36. Assuming lead 36 to be at ground potential, C1 will continue to charge (if the charging circuit remains uninterrupted) until the voltage across C1 approaches the voltage at lead 10 (less the voltage drops across base-emitter junction TR2 and emitter collector of TR1). Upon the occurrence of the positive going edge of pulse 54 the voltage at the collector of TR1 rises abruptly and, since the voltage across C1 can not change instantaneously, the voltage rise appears at point 50 as shown by waveform 56, thereby turning off TR2. Thereafter, C1 discharges through timing circuit 44 until the voltage at point 50 attains the level at which TR2 is again turned on. The off time of TR2, therefore, will be constant dependent upon the time constant of circuit 44 only if the charge on capacitor C1 at the occurrence of the positive going edge of pulse 54 is a constant. This latter condition can be met if the width of pulse 54 is made sufficiently large. The voltage across the motor 12, which still has not attained its controlled constant speed at this time, is shown in FIG. 2(b).

Figure 2B:
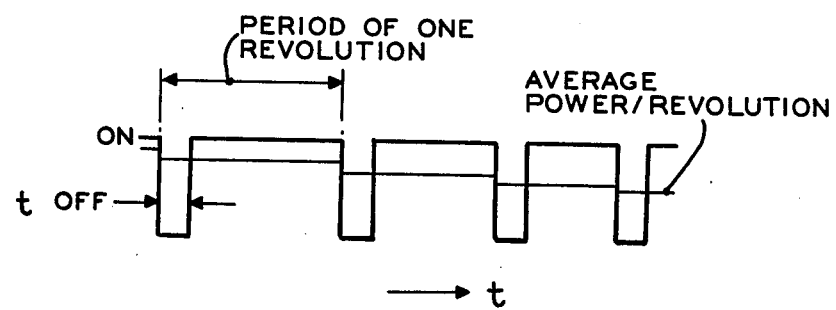
Figure 2C:
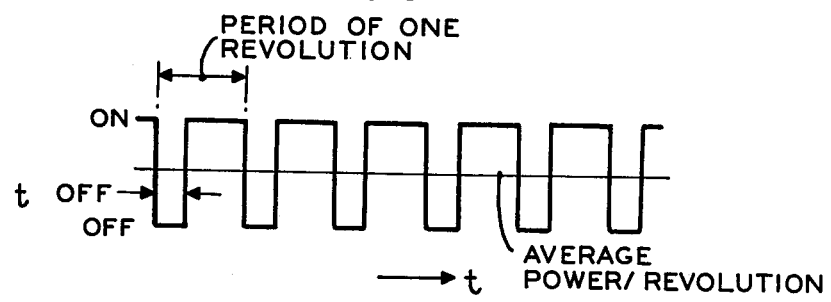

As the rotational speed of the motor 12 continues to increase, the period of each successive revolution decreases as shown in FIG. 2(b). But the time duration of the OFF state of the transistor TR2 remains constant for each revolution. The average current supplied to the motor 12 therefore decreases until the motor can no longer accelerate: this is illustrated in FIG. 2(c). The rotational speed of the motor 12 thus stabilizes at a constant value determined by the selected one of the aformentioned time constants, any increase in speed tending to reduce the average current supply and any decrease in speed tending to increase the average current supply. Typically, the aforementioned time constants differ by a factor of four to cater for two different ranges of depth typically 0–60 feet and 0–240 feet to be measured by the depth sounder, and each time constant may be finely adjusted by means of the variable resistors RV1 and RV2 respectively for calibration purposes. The smaller time constant corresponds to the greater of the two constant controlled motor speeds, which in turn corresponds to the smaller of the two ranges of depth.

As already mentioned, acceleration of the motor 12 from rest is relatively rapid by virtue of threshold action provided by the response of the transistor TR1 to the increasing magnitude of the pulse induced in the winding 34. Additionally, the constant controlled speeds of the motor 12 are relatively insensitive to voltage variations of the power supply 37, since the voltage at the emitter of the transistor TR4 closely follows the voltage at the collector of the transistor TR2, whose supply voltage from the rail 40 is stabilized by the zener diode Z1. Moreover, these constant controlled speeds are relatively insensitive to ambient temperature changes, since these changes merely produce small variations in the base-emitter voltage $V_{BS}$ of the transistor TR2, which variations are small compared to the signal at the base of the transistor TR2. Finally, the circuit 10 has relatively few components and is thus inexpensive, and it is simple to adjust the constant controlled speeds by means of the switch 48, and the variable resistors RV1, RV2.

It will be appreciated that many modifications may be made to the described embodiment of the invention, without departing from the spirit and scope of the appended claims. In particular, transducers other than the magnet 32 and winding 34 may be used to sense the rotational speed of the motor 12, for example a rotating light shutter which is driven by the motor and arranged to periodically interrupt the supply of light to a photocell. Moreover, the timing circuit 44 and transistor TR2 can be replaced by a more conventional two-transistor monostable circuit of the multi-vibrator type, in which case the circuit comprising the transistors TR3, TR4 for controlling the supply of current to the motor 12 need not include transistors of complementary type. Also, the motor 12 need not form part of a depth-sounder, but could for example be used to drive the turntable of a portable or other record player.

What is claimed is:

1. A speed-controlling circuit for controlling the rotational speed of a D.C. motor by selectively connecting the motor to a power supply circuit and disconnecting the motor from the power supply circuit, said speed-controlling circuit comprising:
   switching circuit means for controlling the supply of electric current to the motor, said switching circuit means being connected to the power supply and to the motor and having an ON state causing the motor to be connected across the power supply circuit and an OFF state causing the motor to be disconnected from the power supply circuit;
   transducer means coupled with the motor and responsive to the rotational speed thereof to produce an electric pulse for each motor revolution, the magnitude of said electric pulses increasing with increased motor speed;
   threshold circuit means connected to the transducer means to receive therefrom said electric pulses and including means for providing a threshold electric level, means for comparing the magnitude of each received electric pulse with said threshold electric level and means for providing a control pulse in response to each electric pulse whose magnitude exceeds the threshold electric level; and
   timing circuit means connected to the threshold means to receive said control pulses therefrom and responsive to each received control pulse to place the switching circuit means in the OFF state thereof for a time interval of constant, fixed duration which is less than the duration of a motor revolution, said timing circuit maintaining the switching circuit means in the ON state except during said time intervals of constant, fixed duration, wherein said timing circuit means further comprises a capacitor, means connected to the capacitor and to the threshold circuit means for charging the capacitor to a selected constant potential in response to each control pulse provided by the threshold means, means for discharging the capacitor at a selected constant rate; and means connected to the capacitor and to the switching circuit means for placing and maintaining the switching circuit means in the OFF state thereof while the potential on the capacitor exceeds a selected potential level and for placing and maintaining the switching circuit means in the ON state thereof while the potential on the capacitor is below said selected potential level;
   whereby current is at first supplied to the motor without interruption until the motor attains a selected speed at which the electric pulses from the transducer means exceed the selected threshold level, and then the supply of current to the motor is shut off for a constant, fixed time interval during each revolution of the motor, but said constant, fixed intervals occur at a rate proportional to the motor speed, to thereby quickly reach and then maintain a selected operational revolution speed.

2. A speed-controlling circuit as in claim 1 wherein the means for providing a threshold level, for comparing the electric pulses with the threshold level and for providing control pulses comprise:
   a first transistor having a base and two main terminals;
   a first biasing network connecting the two main terminals across the power supply circuit and supplying to the base a biasing voltage, the sum of the base biasing voltage and the electric pulses applied to the base causing the first transistor to be in a conducting state only while the magnitude of an electric pulse exeeds a selected level; and
   output means connected to one of the main terminals of the first transistor and providing an output signal reflecting the conducting and nonconducting state of the first transistor and forming said control pulses.

3. A speed controlling circuit for a D.C. electric motor comprising: a power supply circuit having a positive and a negative side; a switching circuit connected in series combination with the motor and means connecting said series combination between the positive and the negative side of the power supply circuit; a transducer coupled with the motor and responsive to each revolution thereof to provide a positive going electric pulse whose magnitude increases with increased motor speed; an NPN transistor having an emitter connected to the negative side and a first load resistor connecting the collector thereof to the positive side; means connecting the transistor base to the transducer means for applying said electric pulses to the transistor base; a first biasing circuit connecting the transistor to the power supply and maintaining the transistor in a nonconducting state except while the magnitude of an electric pulse applied to the base thereof exceeds a selected level corresponding to a selected motor speed; a PNP transistor having an emitter connected to the positive side and a second load resistor connecting the collector thereof to the negative side; a capacitor connected between the collector of the NPN transistor and the base of the PNP transistor; a second biasing network including a resistive network connecting the base of the PNP transistor to the negative side, said second biasing network maintaining the PNP transistor in a conducting state except when the NPN transistor is nonconducting and the capacitor is charged to a potential above a selected potential level; said capacitor being charged to a potential above said selected level while the NPN transistor is conducting and being discharged at a selected rate through said resistive network while the NPN transistor is nonconducting; and means connecting the collector of the PNP transistor to the switching circuit means for causing the switching means to conduct and supply current to the motor only while the PNP transistor is conducting; whereby steady current is supplied to the motor at first, until it reaches said selected speed from rest, and then the current supply is shut off during each revolution for an interval whose duration is constant, but the rate of occurrence of the constant duration intervals is varied depending on motor speed variation so as to maintain the motor at a selected operational speed.

4. A speed-controlling circuit as in claim 3 wherein the transducer means comprise a disk coupled with the motor for concurrent rotation therewith, a magnet affixed to the disk for rotation therewith, and a coil mounted adjacent the disk and connected between the negative side of the power supply and the base of the NPN transistor, said magnet inducing said electric pulses across the coil upon rotation of the disk.

5. A speed-controlling circuit as in claim 4 wherein said switching circuit means comprise a Darlington pair circuit biased into a normally conducting state and connected to the collector of the PNP transistor to be placed in a nonconducting state while the PNP transistor is nonconducting.

* * * * *

UNITED STATES PATENT OFFICE
CERTIFICATE OF CORRECTION

Patent No. 4,011,491          Dated March 8, 1977

Inventor(s) Lawrence L. Grover and David L. Plangger

It is certified that error appears in the above-identified patent and that said Letters Patent are hereby corrected as shown below:

Column 1, line 12, change "much" to --such--.
Column 1, line 15, change "D.c." to --D.C.--.
Column 1, line 60, change "or" to --of--.
Column 1, line 66, change "thereby" to --whereby--.

Column 2, line 56, change "seals" to --scale--.
Column 2, line 62, change "proportonal" to --proportional--.
Column 3, line 4, change "os" to --is--.
Column 3, line 14, change "which" to --while--.
Column 3, line 36, change "PHP" to --PNP--.

Column 3, line 43, change "super-Bets" to --super-Beta--.
Column 3, line 56, change "21" to --Z1--.
Column 3, line 66, change "curret" to --current--.
Column 3, line 68, change "2(ia)" to --2(a)--.
Column 5, line 4, change "$V_{B5}$" to --$V_{BE}$--.

Signed and Sealed this

Twenty-ninth Day of November 1977

[SEAL]

Attest:

RUTH C. MASON      LUTRELLE F. PARKER
Attesting Officer      Acting Commissioner of Patents and Trademarks